United States Patent [19]

Hemingway

[11] Patent Number: 5,119,072

[45] Date of Patent: Jun. 2, 1992

[54] APPARATUS FOR MONITORING CHILD ACTIVITY

[76] Inventor: Mark D. Hemingway, 2359 Meadowcroft, Burton, Mich. 48519

[21] Appl. No.: 633,048

[22] Filed: Dec. 24, 1990

[51] Int. Cl.$^5$ .............................................. G08B 23/00
[52] U.S. Cl. .................................... 340/573; 340/539
[58] Field of Search .................... 455/100, 95, 229; 340/573, 539

[56] References Cited

U.S. PATENT DOCUMENTS

| | | | |
|---|---|---|---|
| 2,710,345 | 6/1955 | Stephens | 455/100 |
| 3,087,117 | 4/1963 | Mitchell | 455/100 |
| 3,105,938 | 7/1960 | Onnigian | 455/100 |
| 3,177,481 | 4/1965 | Joy et al. | 340/573 |
| 4,593,273 | 6/1986 | Narcisse | 340/539 |
| 4,598,272 | 7/1986 | Cox | 340/573 |
| 4,785,291 | 11/1988 | Hawthorne | 340/539 |
| 4,814,751 | 3/1989 | Hawkins et al. | 340/539 |
| 4,885,571 | 12/1989 | Pauley et al. | 340/573 |
| 4,885,796 | 12/1989 | Loftus et al. | 455/100 |
| 4,899,135 | 2/1990 | Ghahariiran | 340/573 |

FOREIGN PATENT DOCUMENTS 2913563 4/1979 Fed. Rep. of Germany ...... 340/573

Primary Examiner—Jin F. Ng
Assistant Examiner—Christine K. Oda
Attorney, Agent, or Firm—Barnes, Kisselle, Raisch, Choate, Whittemore & Hulbert

[57] ABSTRACT

Apparatus for monitoring a child or the like includes a transmitter having a microphone and an oscillator coupled to an antenna within an enclosure for mounting on a child's arm and transmitting a frequency-modulated rf signal from the antenna. A separate receiver, within an enclosure constructed to be hand carried by a parent, includes circuitry for separating the audio and carrier components of the signal received at the receiver, and comparing field strength of the carrier component to a range threshold. When the amplitude of the carrier field strength is less than the threshold value, an alarm is sounded to indicate that the child is out of desired range. The audio component is fed to a speaker so that the parent can monitor the activities of the child.

13 Claims, 2 Drawing Sheets

APPARATUS FOR MONITORING CHILD ACTIVITY

The present invention is directed to apparatus for monitoring the range of a person from a monitoring location, and more particularly to apparatus for monitoring both the range to and audio activity around a child.

BACKGROUND AND OBJECTS OF THE INVENTION

There have heretofore been proposed in the art a number of schemes and techniques for monitoring the range to or location of a person with respect to a monitoring station, such as the range to a child or patient. In general, systems heretofore proposed have been characterized by a high degree of cost and complexity. It is therefore a general object of the present invention to provide an apparatus of the described character that is of simple and economical construction, that may be worn by a child or other person without obstructing daily activity, in which the receiver employed by the parent or other monitoring person is transportable in the hand or pocket for monitoring the range to and activity around a child away from the home during a walk, for example, and that indicates an alarm condition in the event that the transmitter unit is removed from the child or other person to be monitored.

SUMMARY OF THE INVENTION

Apparatus for monitoring range to a person from a monitoring station in accordance with the present invention comprises a transmitter having a transmitting antenna for radiating a frequency-modulated rf carrier signal, and an enclosure with facility for removably fastening the enclosure to a person to be monitored. A separate receiver includes circuitry coupled to a receiving antenna for monitoring field strength of the carrier signal received at the antenna, and for indicating range from the receiver to the transmitter as a function of such field strength. In the preferred embodiment of the invention, the transmitter includes a microphone positioned within the enclosure for generating an audio signal as a function of sounds around the transmitter, and the rf carrier signal is frequency modulated as a function of such audio signal. The receiver in such preferred embodiment of the invention includes corresponding facility for separating the audio signal from the frequency-modulated carrier signal at the receiving antenna, and an audio speaker for making audible at the receiver sounds surrounding the transmitter and detected by the microphone. Thus, the parent or other monitoring person may monitor both range to the child and activity of the child as reflected by the audio sounds detected by the microphone.

The receiving unit in the preferred embodiment of the invention comprises a rectangular enclosure with knurled knobs positioned along opposed sidewalls of the enclosure for adjusting both volume of audio radiated by the speaker and alarm range between the transmitter and the receiver. The transmitter electronics are mounted on a printed circuitboard that forms one wall of a transmitter enclosure. The circuitry on the circuitboard forms a ground plane positioned internally of the enclosure and with respect to straps for fastening the transmitter to a child's arm so that the ground plane is capacitively coupled to the skin of the wearer, and the wearer's body thus forms part of the transmitting antenna. In this way, field strength of the transmitted signal is automatically greatly reduced in the event that the transmitter is removed from the wearer, and generates an alarm condition at the receiver.

n accordance with a further aspect of the present invention, the circuitry of the transmitter is specifically constructed not only to reduce the number of components needed to form the necessary circuit functions, but also to reduce power consumption and thereby enhance transmitter battery life. This is accomplished by employing an operational amplifier for coupling the microphone output to the carrier signal oscillator, and connecting the reference or offset voltage input of the amplifier to the junction of two series-connected batteries. In this way, circuit components for generating separate offset voltages at the amplifier and oscillator are automatically eliminated, as is the dc coupling capacitor normally positioned between the amplifier output and the oscillator input.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
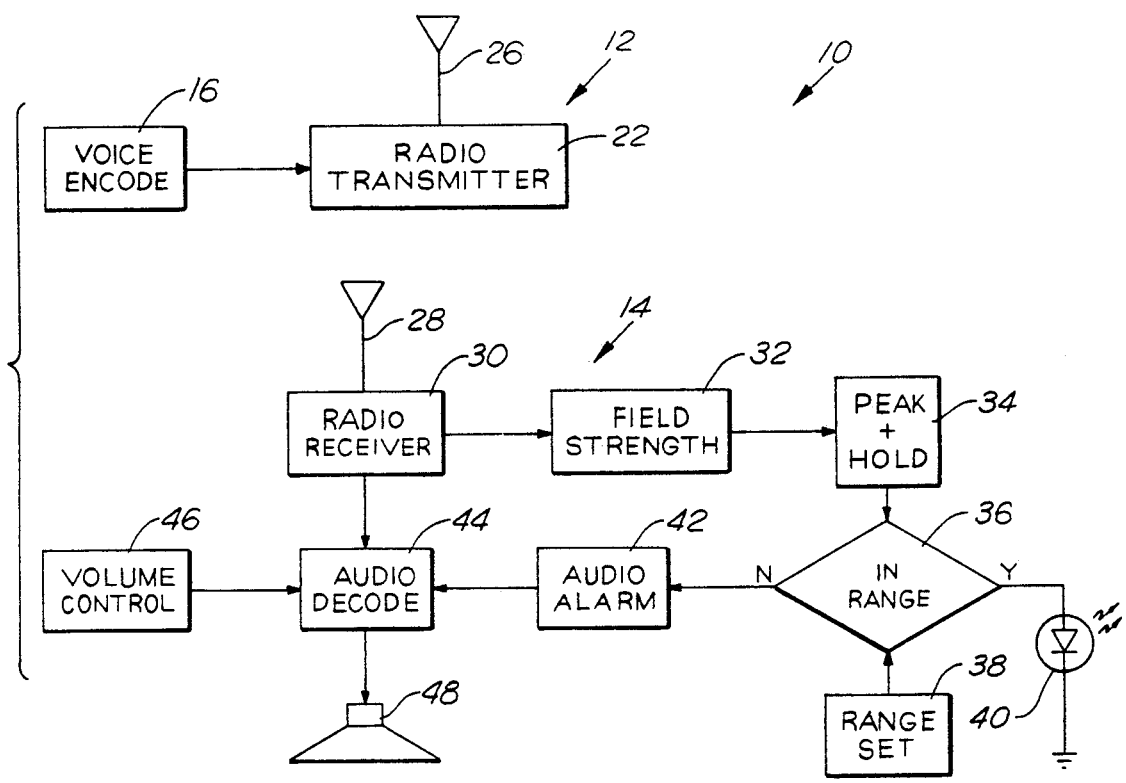
FIG. 1 is a functional block diagram of apparatus for monitoring range to a child in accordance with a presently preferred implementation of the invention.

FIG. 1 illustrates apparatus 10 in accordance with a presently preferred embodiment of the invention as comprising separate transmitter and receiver units 12,14. Transmitter 12 comprises a voice encoder 16 that includes a microphone 18 (FIG. 5) and an audio amplifier 20. Voice encoder 16 is connected to a radio transmitter 22 that includes an rf oscillator 24 (FIG. 5) for frequency modulating an rf carrier signal and feeding such signal to an rf transmitting antenna 26. Receiver 14 includes a receiving antenna 28 connected to receiver circuitry 30 for separating the audio and rf carrier components of the received signal. Carrier field strength is coupled at 32 to a circuit 34 for sampling and holding a signal indicative of peak field strength amplitude. Field strength is compared at 36 with a threshold 38 selected by the operator. As long as the peak carrier field strength is greater than the this threshold, the transmitter is considered to be within range and an LED 40 is illuminated. When the peak carrier field strength decreases below the range threshold 38, the LED is extinguished and an appropriate signal is fed to audio range alarm circuitry 42. An audio decoder 44 receives a first signal input from receiver 30 indicative of the audio component of the frequency-modulated signal at antenna 28, and a second signal input from audio alarm 42. A volume control input 46 is also fed to audio decode circuit 44 for operator selection of amplitude of the audio voice and alarm signals. The output of decoder 44 is fed to a speaker 48.

Figure 2:
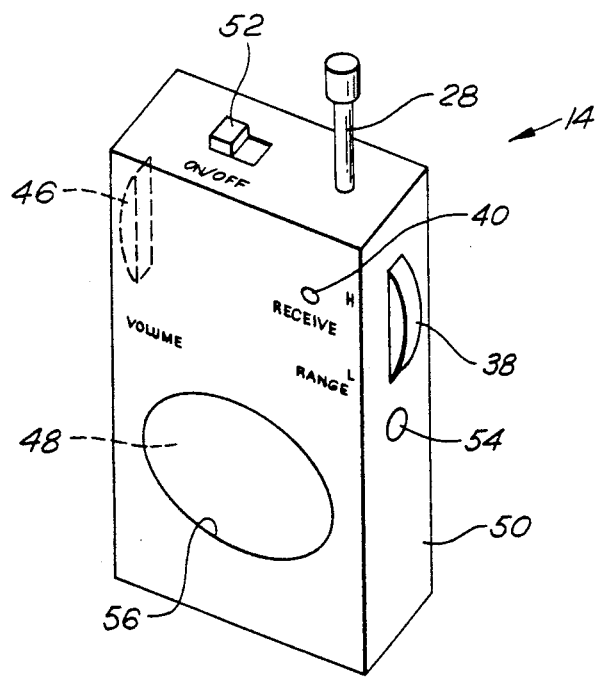
FIG. 2 is a perspective view of the receiver or monitoring unit illustrated functionally in FIG. 1.

FIG. 2 illustrates receiver unit 40 as comprising a rectangular enclosure 50 of dimensions suitable for holding in an adult's hand, or placement in a shirt or a jacket pocket. Range selection and volume control adjustments 38,46 (FIGS. 1 and 2) include knurled knobs that extend through opposed sidewalls of enclosure 50 for operator selection of the corresponding control parameters. Antenna 28 extends through an end wall of enclosure 50, with an on/off slide-type power switch 52 being positioned adjacent thereto. An LED 54 adjacent to range adjustment knob 38 indicates received signal to the receiver circuitry. The front wall of enclosure 50 includes a suitable opening 56 positioned adjacent to speaker 48 for emitting the audio sound and alarm signals to the monitoring person.

Figure 3:
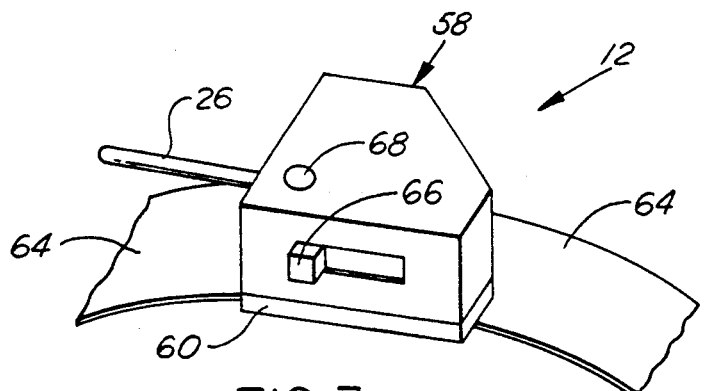
FIG. 3 is a perspective view of the transmitting unit functionally illustrated in FIG. 1.
Figure 4:
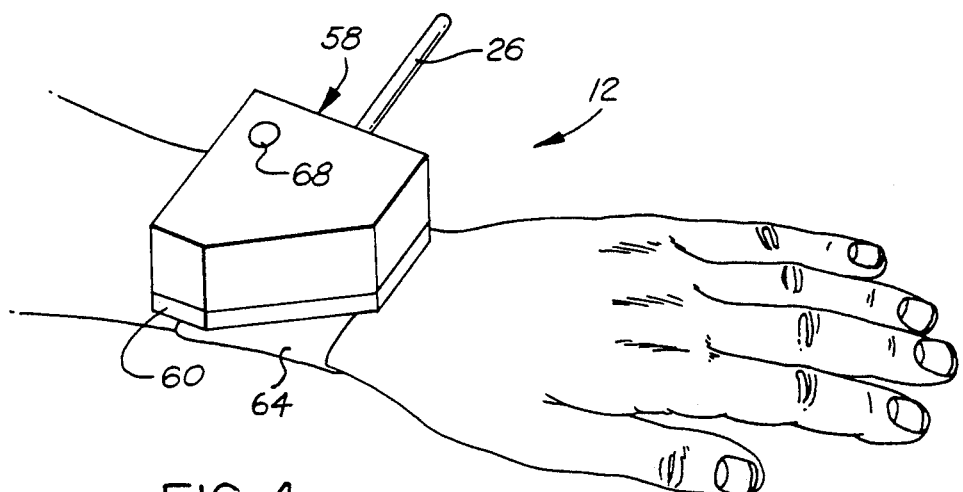
FIG. 4 is a perspective view of the transmitting unit worn by a child.

FIGS. 3 and 4 illustrate transmitter 12 as comprising a generally rectangular enclosure 58. The circuitry of transmitter 12 (FIGS. 1 and 5) is mounted on a printed circuitboard 60 that forms one wall of enclosure 58. Circuitboard 60 is constructed so as to have a ground plane 62 (FIG. 5) positioned internally of enclosure 58 for capacitive coupling to the skin of a wearer when the straps 64 fastened to enclosure 58 are affixed to the wearer (as shown in FIG. 4). The wearer's body thus effectively becomes part of the transmitting circuitry and the transmitting antenna, so that the power of transmission and transmitted field strength are greatly reduced in the event that the transmitter is removed from the wearer, automatically resulting in an out-of-range audio alarm signal at the receiver. Transmitter 58 also includes a slide-type power switch 66 positioned along one sidewall of enclosure 58, and an LED 68 for indicating application of battery power to the transmitter circuitry.

Figure 5:
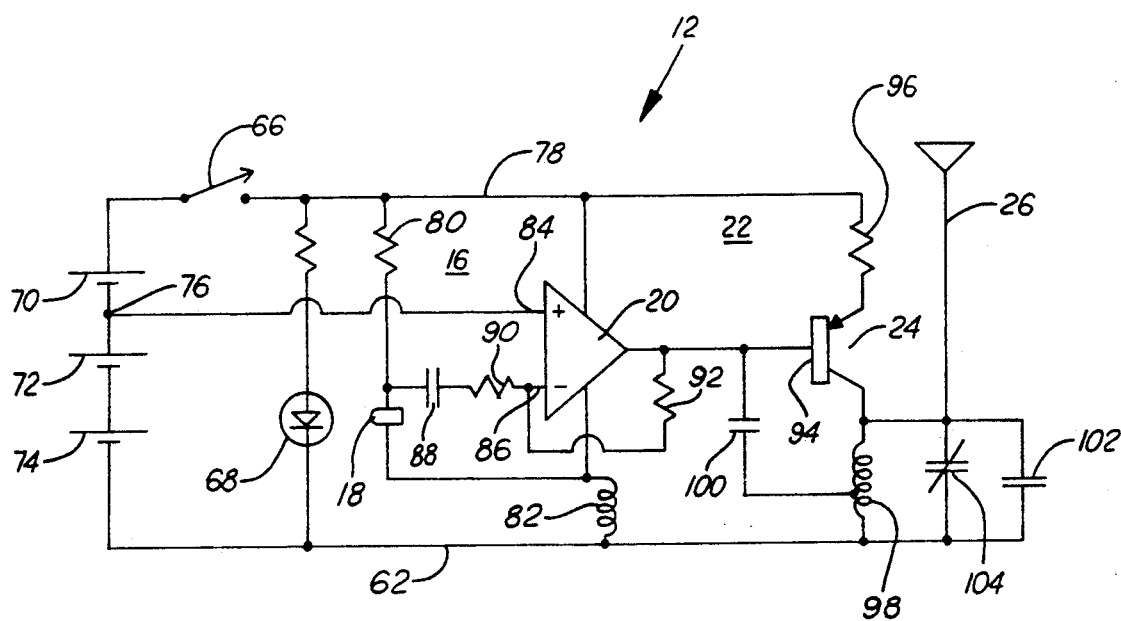
FIG. 5 is an electrical schematic diagram of the transmitter unit illustrated functionally in FIG. 1.

FIG. 5 illustrates the electronic circuitry of transmitter 12. A pair of batteries 70,72 (as well as a third battery 74) are connected in series to provide a first dc potential at the junction 76 of batteries 70,72, a second dc potential at the positive terminal of battery 70, and a reference or ground potential at the negative terminal of battery 74. Switch 66 connects the positive terminal of battery 70 to a power bus 78, across which LED 68 (FIGS. 3-5) is connected. The negative terminal of battery 74 is connected to ground plane 62. Microphone 18 is connected in series with a current limiting resistor 80 and an rf choke 82 between bus 78 and ground plane 62. Amplifier 20 comprises an operational amplifier having a reference input 84 connected to junction 76, and a signal input 86 connected to microphone 18 through a blocking capacitor 88 and a resistor 90. The output of amplifier 20 is connected to signal input 86 through a resistor 92. The power terminals of amplifier 20 are connected to voltage bus 78, and to ground 62 through choke 82.

Rf oscillator 24 includes a PNP transistor 94 having its base connected to the output of amplifier 20, its emitter connected through a resistor 96 to bus 78, and its collector connected through a coil 98 to ground 62. A feedback capacitor 100 is connected between a tap on coil 98 and the base of transistor 94. A fixed capacitor 102 and a variable capacitor 104 are connected in parallel across coil 98 for setting the base frequency of oscillator 24. Antenna 26 is connected to the collector of transistor 94. Use of series-connected batteries for powering transmitter 12, and connection of amplifier reference input 84 to battery junction 76, provide appropriate dc offset for generation of the audio input to the oscillator without requiring the usual amplifier input biasing resistors or pull-up and pull-down amplifier output resistors. Further, the series-connected battery arrangement of FIG. 5 automatically provides biasing for oscillator 24, while eliminating the usual biasing resistors for transistor 94. Since the audio signal input to the oscillator is carried by the dc offset, there is no need for a dc isolation capacitor between the output of amplifier 20 and the input of oscillator 24. Choke 82 isolates negative rf feedback from amplifier 20 and quenches oscillator 24. The transmitter design of FIG. 5 thus reduces both number of components and power consumption as compared with transmitters for a similar purpose heretofore proposed.

I claim:

1. Apparatus for monitoring range to a person from a monitoring station comprising:
   a transmitter including an enclosure having means for removably fastening said enclosure to a person to be monitored, means disposed within said enclosure for generating a frequency-modulated rf carrier signal, and a transmitting antenna projecting from said enclosure and coupled to said generating means for radiating said signal, and
   a receiver including a receiving antenna, means coupled to said receiving antenna for monitoring field strength of said carrier signal, means coupled to said means for monitoring field strength for sampling and holding a signal indicative of peak field strength, and means coupled to said means for sampling and holding for indicating range from said receiver to said transmitter as a function of peak field strength of said carrier signal at said receiver.

2. The apparatus set forth in claim 1 wherein said receiver further includes means for adjusting a range threshold, and wherein said range-indicating means comprises means for comparing said peak field strength to said threshold and means for indicating an alarm condition when peak field strength of said carrier signal at said receiver is less than said range threshold.

3. The apparatus set forth in claim 2 wherein said transmitter includes a microphone positioned within said enclosure for generating an audio signal as a function of audio sounds around said transmitter, and wherein said means for generating said frequency-modulated rf carrier signal comprises means for generating an rf carrier signal and means for modulating frequency of said carrier signal as a function of said audio signal.

4. The apparatus set forth in claim 3 wherein said receiver further comprises means coupled to said receiving antenna for separating said audio signal from said carrier-signal, an audio speaker, and means for coupling said audio signal to said speaker such that audio sounds surrounding said transmitter are audible at said receiver.

5. The apparatus set forth in claim 4 wherein said receiver further includes means for selectively adjusting volume of audio signals coupled to said speaker.

6. The apparatus set forth in claim 5 wherein said receiver further comprises a rectangular enclosure constructed to be hand-held by a user in one hand, said means for adjusting volume and range comprising knobs positioned along opposed sidewalls of said enclosure, said receiving antenna projecting from an end wall of said enclosure and said speaker being positioned adjacent to a speaker opening in a front panel of said enclosure.

7. The apparatus set forth in claim 4 wherein said transmitter enclosure includes a wall, said means for generating said rf carrier signal including a ground plane so positioned internally of said wall with respect to said removably-fastening means as to be capacitively coupled to a wearer's skin through said wall when said transmitter is fastened to a wearer, said enclosure being constructed such that the wearer's body thereby forms part of said transmitting antenna whereby removal of the transmitter results in low field strength at the receiver.

8. The apparatus set forth in claim 3 wherein said transmitter comprises at least first and second batteries connected in series to supply a first dc potential at the junction of said series-connected batteries, and a second dc potential and a ground potential at opposed ends of said batteries; an operational amplifier having signal, reference and power inputs, and an output; means connecting said power input to said second dc potential; means connecting said microphone across said opposed ends of said batteries to said signal input; means connecting said reference input to said junction to provide a dc offset to said amplifier at a voltage potential between said second dc potential and ground potential; and an rf oscillator having a signal input directly connected to said amplifier output.

9. The apparatus set forth in claim 8 further comprising an rf choke; and wherein said operational amplifier includes power input terminals, one of said terminals being connected to said second dc potential and the other being connected through said choke to ground potential.

10. The apparatus set forth in claim 9 wherein said microphone is also connected to ground potential through said choke.

11. The apparatus set forth in claim 8 wherein said transmitter enclosure includes a wall, said means for generating said rf carrier signal including a ground plane so positioned internally of said wall with respect to said removably-fastening means as to be capacitively coupled to a wearer's skin through said wall when said transmitter is fastened to a wearer, said enclosure being constructed such that the wearer's body thereby forms part of said transmitting antenna whereby removal of the transmitter results in low field strength at the receiver.

12. The apparatus set forth in claim 1 wherein said transmitter enclosure includes a wall, said means for generating said rf carrier signal including a ground plane so positioned internally of said wall with respect to said removably-fastening means as to be capacitively coupled to a wearer's skin through said wall when said transmitter is fastened to a wearer, said enclosure being constructed such that the wearer's body thereby forms part of said transmitting antenna whereby removal of the transmitter results in low field strength at the receiver.

13. The apparatus set forth in claim 4 further comprising means coupling said speaker to said means for indicating said alarm condition to provide an audible indication of said alarm condition at said speaker.

* * * * *